United States Patent
Manjikian

[15] 3,674,152
[45] July 4, 1972

[54] REVERSE OSMOSIS TEST CELL
[72] Inventor: Serop Manjikian, Del Mar, Calif.
[73] Assignee: Universal Water Corporation, Del Mar, Calif.
[22] Filed: Aug. 25, 1970
[21] Appl. No.: 66,813

[52] U.S. Cl. .............................210/321, 210/409, 210/433, 210/456
[51] Int. Cl. ...................................B01d 35/22, B01d 31/00
[58] Field of Search....................210/405, 456, 23, 321, 433, 210/404, 414

[56] References Cited

UNITED STATES PATENTS 1,139,331  5/1915  Boulard ..............................210/456 X

OTHER PUBLICATIONS

Manjikian et al., " Improvement in Fabrication Techniques for Reverse Osmosis Desalination Membranes," from Proceedings of the First International Symposium On Water Desalination, Vol. 2 pp. 159-172

*Primary Examiner*—Frank A. Spear, Jr.
*Attorney*—Clement H. Allen

[57] ABSTRACT

A semipermeable membrane-containing cell, useful when connected to a pump and a pressure control to form a reverse osmosis system, has an adjustable gap through which the feed water flows over the membrane surface. The gap is formed between the membrane surface and the surface of a disk having a stem screw-thread mounted inside the cell so that rotation of the stem will move the disk surface closer to or farther from the membrane surface. An O-ring seals the disk stem to the cell interior and provides friction to maintain the gap adjustment.

5 Claims, 5 Drawing Figures

INVENTOR.
SEROP MANJIKIAN

BY
AGENT.

INVENTOR.
SEROP MANJIKIAN

BY

AGENT.

REVERSE OSMOSIS TEST CELL

This invention relates to apparatus for treatment of liquids by reverse osmosis. More particularly, it relates to an improved membrane-containing cell which, when connected to a suitable pump and pressure control, can constitute a reverse osmosis system.

Reverse osmosis is becoming widely known and accepted as a process for purifying or concentrating liquids. It is adapted for many purposes but the type of membrane, operating conditions such as feed liquid pressure, and cell dimensions and geometry, must often be specifically designed to produce best efficiency for any particular application. Laboratory reverse osmosis systems have been produced which employ a miniature cell containing a small membrane and suitable auxiliary equipment. The cells in such systems permit ready changing of membranes, and pumps and controls are available so that the best combination of membrane type, liquid pressure and other factors can be determined to solve any specific purification or concentration problem. However, cell designs heretofore used have not permitted changes in cell geometry so that the effect of greater or less gap or clearance above the membrane surface can be studied. The effect of changes in membrane surface clearance is to vary the flow of feed liquid to or across the membrane surface which may produce more or less turbulence, or laminar flow. The characteristics of the liquid flow over the membrane surface will greatly influence the efficiency of the membrane and the operation of the entire system.

Summarized briefly, the reverse osmosis cell of this invention comprises a pressure resistant body containing a semipermeable membrane, with means for supplying solution to a surface of said membrane, means for releasing solution from said body and means for collecting purified solution from said body, and provided with an adjustable gap or spacing over the surface of said membrane to which said solution is applied. The gap is formed between the surface of the membrane and the surface of a disk attached to a stem which is adjustably mounted inside the body.

Construction and operation of the apparatus of this invention will be more readily apparent from the following detailed description thereof and from the annexed drawings in which.

Figure 1:
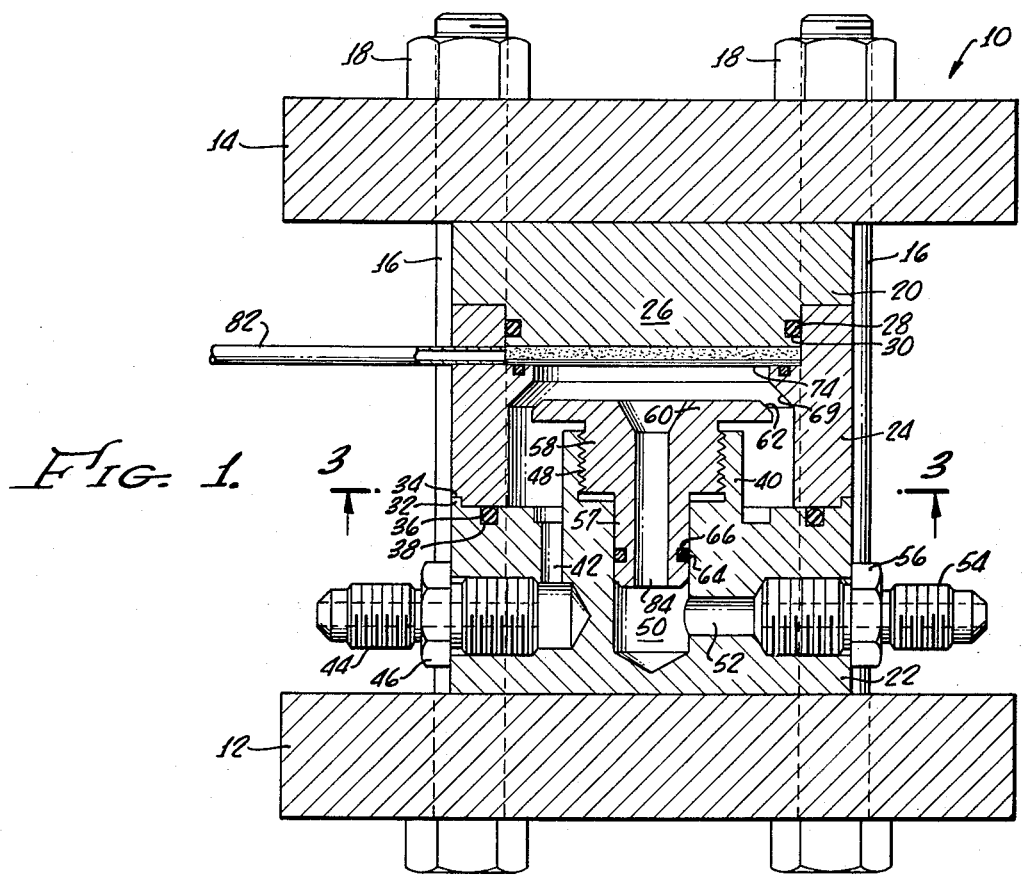
FIG. 1 shows a vertical, central cross section of a cell embodying features of this invention.
Figure 2:
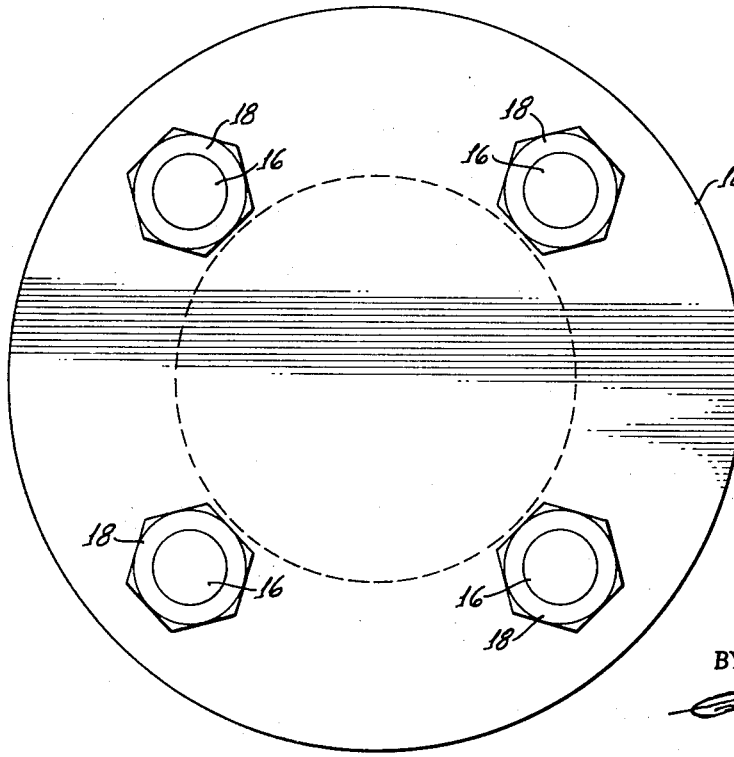
FIG. 2 shows a top view of the cell of FIG. 1.
Figure 3:
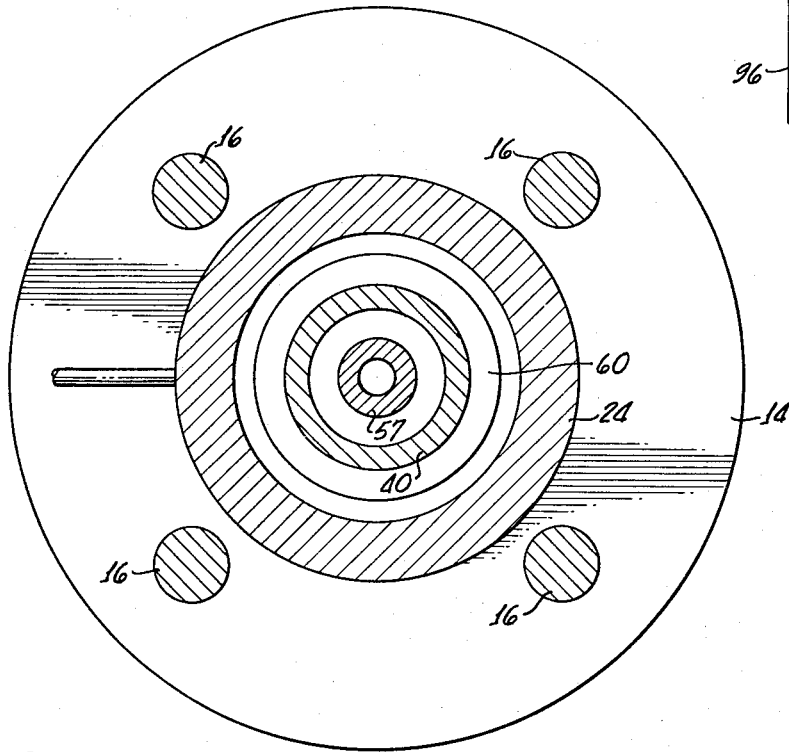
FIG. 3 shows a horizontal cross section of the cell body of FIG. 1 taken along the line 3—3.

Referring now to FIGS. 1, 2, and 3, the cell 10 comprises a heavy bottom plate 12 and a heavy top plate 14 connected by tie rods 16 having tightening nuts 18. Between plates 12 and 14 are top block 20 and bottom block 22 and in between these is generally tubular body 24. Top block 20 is formed with a depending central portion 26 whose sides are sealed to the contiguous sides of body 24 by O-ring 28 set in groove 30. Bottom block 22 is provided, where it meets the bottom of body 24, with a shoulder 32 which fits into a corresponding groove 34 in body 24 and also is fitted with O-ring 36 in groove 38 which seals it to the bottom of body 24. Therefore it will be seen that the top and bottom plates 12 and 14, when drawn firmly together by tightening nuts 18 on bolts 16, maintain top block 20, body 24 and bottom block 22 in tight aligned and sealed relationship. Top block 20 and bottom block 22 together with body 24 comprise the cell casing.

Bottom block 22 is further characterized by central hollow post 40 whose outer surface is spaced apart from the facing inner surface of body 24 to form an annular channel which leads on one side through duct 42 to the interior of fitting 44 which penetrates and is threaded into bottom block 22 as shown, being tightened in place by nut 46. This assembly forms means for releasing solution from the cell.

The inner upper surface of post 40 is threaded as at 48, its lower portion having a bore 50 connecting through duct 52 to the interior of another fitting 54 which is threaded into the bottom block 22 as shown, and is tightened in place by nut 56. This assembly forms means for supplying solution to the membrane surface.

Screwed into threads 48 in central post 40 is stem 58 to which is fixedly attached at its top a disk 60 having a beveled edge as at 62. A lower portion 63 of stem 58 is of somewhat lesser diameter and is sealed to the walls of bore 50 in block 22 by O-ring 64 in groove 66. This seal permits some sliding and rotational movement.

Figure 4:
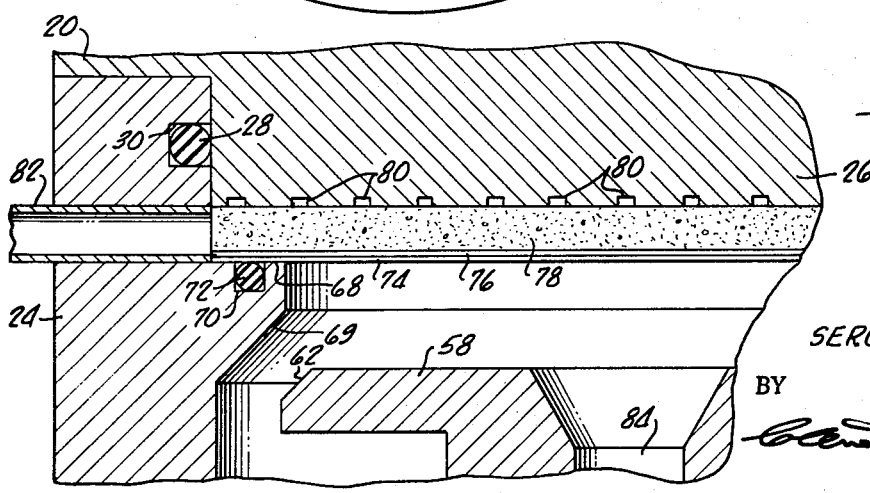
FIG. 4 shows a detailed enlarged view of a vertical section of the membrane and its support.

Body 24 near its top is characterized by an interiorly projecting annular shoulder or ledge 68 with tapered surface 69 and having in its upper surface a groove 70 in which is placed O-ring 72, as will be seen more clearly in FIG. 4. On ledge 68 is placed a circular semipermeable membrane 74 and on top of membrane 74 is placed a disk of suitable porous material such as filter paper 76, and on top of paper disk 76 is placed a disk 78 of porous support material such as sintered powdered metal. Porous disk 78 fits against the bottom surface of depending central portion 26 of upper block 20, and which is cut with radial grooves or channels 80 to promote collection of product liquid passing through porous disk 78 to delivery tube 82 which penetrates the wall of body 24. This assembly forms means for collecting purified solution from the cell.

Stem 58 and disk 60 are provided with a common central bore 84 communicating at its open top with the gap or space below membrane 74, and which directs solution against the membrane surface. At its bottom, bore 84 communicates with bore 50 in post 40, thence to duct 52 and to fitting 54. The gap between the top surface of disk 60 and membrane 74 may be varied by rotating stem 58 in threads 48 to move it up or down as will be apparent, while the stem will at all times be sealed to the inner surface of bore 50 by O-ring 64. As the disk 60 is moved up or down the spacing between its beveled edge surface 62 and its facing tapered shoulder surface 69 is correspondingly closed or opened up.

Figure 5:
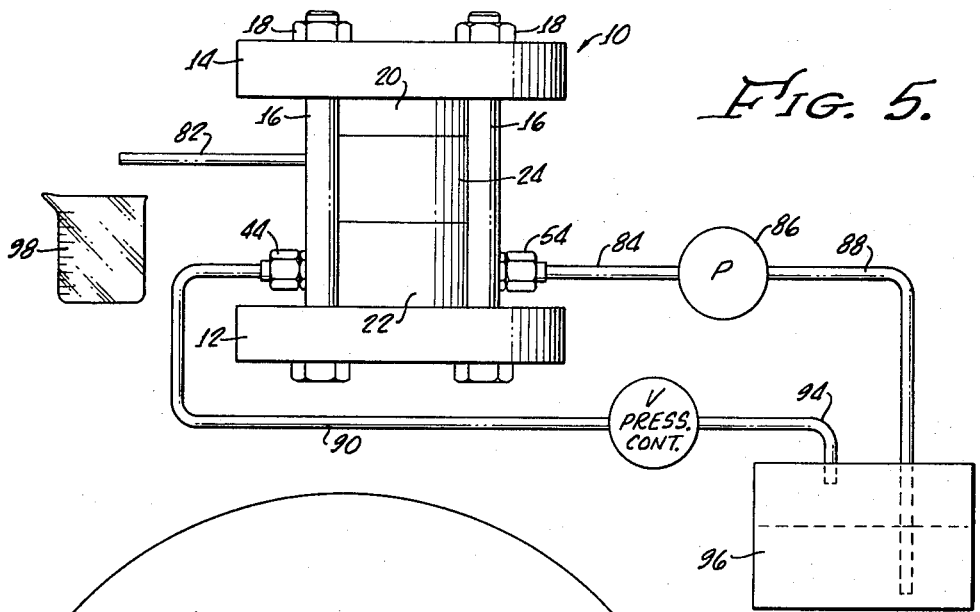
FIG. 5 shows a general schematic drawing of a cell of the type of FIG. 1 connected to auxiliary equipment to form a reverse osmosis system.

Operation of the cell of this invention will be more readily apparent from FIG. 5 in which is shown the cell 10 having its feed water inlet fitting 54 connected by pipe 84 to high pressure pump 86 which takes water to be purified through pipe 88. Brine outlet 44 from cell 10 is connected by pipe 90 to pressure control valve 92, and brine released through pipe 94 may be discarded to waste, or may be recycled as shown to feed through a sump tank 96 back to the feed pump 86 through pipe 88.

Product water passing through membrane 74, filter paper backing 76, porous plate 78 and channels 80 is collected and released through delivery tube 82 into beaker 98 and the amount delivered over a timed interval can be converted to gallons per square foot per day or some other useful units based on the surface area of membrane 74 exposed to the feed liquid, the time and the amount of product water collected.

Feed liquid entering cell 10 through fitting 54 passes through duct 52 then up bore 84 into stem 58 flowing out of the top of bore 84 (which may be slightly flared as shown) onto and over the surface of membrane 74. The liquid flow will be generally radial over the membrane surface then flowing down between opposite tapered surfaces 62 and 62, then through the annular space between post 40 and body 24 then through duct 42 to brine outlet fitting 44.

Adjusting the gap between the top surface of disk 60 and its facing membrane 74 is important to obtain different flow conditions over the membrane surface. It has been established that feed water under pressure on the surface of a semipermeable membrane must be maintained in a state of turbulent flow or can be maintained in a state of laminar flow if the clearance over the membrane is small, to prevent build-up of a layer highly concentrated in salts next to the membrane surface. Such a layer can sharply reduce membrane efficiency by in effect presenting the membrane with local feed solution which would be much more concentrated than would be the actual concentration of the feed. Studies of flow conditions and the effect of various gap distances over the membrane surface can readily be made using the cell of this invention. When the gap has been adjusted by rotating stem 58, then the frictional stability created by O-ring 64 will maintain the adjustment under normal working conditions.

The spacing between the outer edge 62 of disk 60 and the adjacent surface 69 of the inside of the cell can be employed to control or throttle the flow of liquid over the edge of disk 60 and to keep the flow channel of appropriate size relative to the gap between the upper surface of disk 60 and the facing membrane surface. This spacing relationship is automatically adjusted as the stem 58 moves up or down.

I claim:

1. In a cell, useful in apparatus for treating a solution by reverse osmosis, comprising a pressure resistant casing, a membrane and membrane support means inside said casing, means for supplying solution to a surface of said membrane, means for releasing solution from said cell, and means for collecting purified solution from said cell, in which the improvements comprise:

a. said means for supplying solution to said membrane surface including a disk having a surface facing said membrane surface and having a central bore adapted to direct said solution against said surface of said membrane and having its outer edge spaced from the adjacent surface of said casing;

b. means for adjustably mounting said disk inside said casing so that adjustment of said disk will adjust the gap between the surface of said disk and the facing surface of said membrane; and, c. the space between the outer edge of said disk and the adjacent surface of said casing communicating with said means for releasing solution from said cell.

2. A cell according to claim 1 in which a stem is attached to said disk having a common bore therewith, said stem being adjustably mounted in said casing.

3. A cell according to claim 2 in which said stem is mounted by a screw-thread inside said casing so that rotation of said stem will adjust the gap between said surface of said disk and the facing surface of said membrane.

4. A cell according to claim 3 in which said stem is threaded into a bore in a post inside said casing and said stem is sealed to the wall of said bore by an O-ring.

5. A cell according to claim 4 in which said O-ring is maintained under sufficient compression to provide frictional stability to said stem to prevent rotation thereof during operation of said apparatus.

* * * * *